(12) United States Patent
Walter et al.

(10) Patent No.: US 8,959,157 B2
(45) Date of Patent: Feb. 17, 2015

(54) REAL-TIME SPAM LOOK-UP SYSTEM

(75) Inventors: Jason D. Walter, San Jose, CA (US); Eliot C. Gillum, Mountain View, CA (US); Krishna C. Vitaldevara, Fremont, CA (US); Ryan Charles Colvin, Bothell, WA (US); Mehrdad Bidgoli, San Jose, CA (US); Chad W. Mills, Redmond, WA (US); Joshua David Korb, Issaquah, WA (US); Robert Lee McCann, Fall City, WA (US); Douglas John Hines, Kenmore, WA (US); Malcolm Hollis Davis, Kirkland, WA (US); Milenko Drinic, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/493,046

(22) Filed: Jun. 26, 2009

(65) Prior Publication Data
US 2010/0332601 A1    Dec. 30, 2010

(51) Int. Cl.
*G06F 15/16* (2006.01)
*H04L 12/58* (2006.01)

(52) U.S. Cl.
CPC ............ *H04L 12/585* (2013.01); *H04L 51/12* (2013.01)
USPC ...................................................... 709/206

(58) Field of Classification Search
CPC ..................................................... H04L 51/12
USPC ...................................................... 709/206
See application file for complete search history.

(56) References Cited

U.S. PATENT DOCUMENTS

| | | | | |
|---|---|---|---|---|
| 6,321,267 | B1 * | 11/2001 | Donaldson | 709/229 |
| 6,654,787 | B1 * | 11/2003 | Aronson et al. | 709/206 |
| 6,941,348 | B2 * | 9/2005 | Petry et al. | 709/206 |
| 7,096,498 | B2 | 8/2006 | Judge | |
| 7,200,637 | B2 * | 4/2007 | Klos et al. | 709/206 |
| 7,249,175 | B1 * | 7/2007 | Donaldson | 709/225 |
| 7,464,264 | B2 * | 12/2008 | Goodman et al. | 713/154 |
| 7,475,118 | B2 * | 1/2009 | Leiba et al. | 709/206 |
| 7,532,890 | B2 * | 5/2009 | Davies et al. | 455/449 |
| 7,610,341 | B2 * | 10/2009 | Daniell | 709/206 |
| 7,630,727 | B2 * | 12/2009 | Cai et al. | 455/466 |
| 7,636,716 | B1 * | 12/2009 | Cheng | 1/1 |
| 7,707,252 | B1 * | 4/2010 | Harris | 709/206 |
| 7,715,059 | B2 * | 5/2010 | Advocate et al. | 358/405 |
| 7,748,038 | B2 * | 6/2010 | Olivier et al. | 726/24 |
| 7,769,815 | B2 * | 8/2010 | Wang et al. | 709/206 |

(Continued)

OTHER PUBLICATIONS

"CastleControl System Overview", website, http://www.castlecontrol.net/index.php/Spam-Service.html.

(Continued)

*Primary Examiner* — Tauqir Hussain
*Assistant Examiner* — Angela Widhalm
(74) *Attorney, Agent, or Firm* — Jim Ross; Tom Wong; Micky Minhas (57) ABSTRACT

A system and method of managing unsolicited email sent to an email system over a network. Email messages are received at an message at an inbound mail transfer agent. A determination is made as to whether the email message is suspected to be an unsolicited suspect message. One or more queries for additional information on one or more characteristics of the message is initiated. Determinations are made based on replies to the queries before issuing a message accepted for delivery indication to a sending server.

19 Claims, 5 Drawing Sheets

(56) References Cited

U.S. PATENT DOCUMENTS

| | | | |
|---|---|---|---|
| 7,783,706 B1* | 8/2010 | Robinson | 709/206 |
| 7,801,960 B2* | 9/2010 | Hockey | 709/206 |
| 7,937,468 B2* | 5/2011 | Libbey et al. | 709/225 |
| 7,979,082 B2* | 7/2011 | Dholakia et al. | 455/466 |
| 2002/0032727 A1 | 3/2002 | Dias et al. | |
| 2002/0194308 A1* | 12/2002 | Hall | 709/219 |
| 2003/0050984 A1 | 3/2003 | Pickup et al. | |
| 2003/0105712 A1* | 6/2003 | Bodensohn | 705/40 |
| 2003/0158905 A1* | 8/2003 | Petry et al. | 709/206 |
| 2003/0225850 A1 | 12/2003 | Teague | |
| 2004/0059910 A1* | 3/2004 | Allison et al. | 713/154 |
| 2005/0081059 A1* | 4/2005 | Bandini et al. | 713/201 |
| 2005/0172033 A1* | 8/2005 | Mathew et al. | 709/246 |
| 2005/0188036 A1* | 8/2005 | Yasuda | 709/206 |
| 2005/0227739 A1* | 10/2005 | Dowling et al. | 455/566 |
| 2005/0240617 A1 | 10/2005 | Lund et al. | |
| 2006/0015561 A1 | 1/2006 | Murphy et al. | |
| 2006/0031357 A1 | 2/2006 | Misra et al. | |
| 2006/0031359 A1 | 2/2006 | Clegg et al. | |
| 2006/0059238 A1* | 3/2006 | Slater et al. | 709/206 |
| 2006/0075052 A1* | 4/2006 | Oostendorp | 709/206 |
| 2006/0123083 A1* | 6/2006 | Goutte et al. | 709/206 |
| 2006/0218111 A1* | 9/2006 | Cohen | 706/45 |
| 2006/0242243 A1* | 10/2006 | Matsumoto | 709/206 |
| 2007/0041372 A1* | 2/2007 | Rao et al. | 370/356 |
| 2007/0192863 A1* | 8/2007 | Kapoor et al. | 726/23 |
| 2007/0204022 A1* | 8/2007 | Hsu et al. | 709/223 |
| 2007/0208868 A1* | 9/2007 | Kidd et al. | 709/229 |
| 2008/0102799 A1* | 5/2008 | Dholakia et al. | 455/412.1 |
| 2009/0064323 A1* | 3/2009 | Lin | 726/22 |
| 2009/0064329 A1* | 3/2009 | Okumura et al. | 726/22 |
| 2009/0292670 A1* | 11/2009 | Manno | 707/3 |
| 2009/0307320 A1* | 12/2009 | Golan et al. | 709/206 |
| 2010/0017476 A1* | 1/2010 | Shue | 709/206 |

OTHER PUBLICATIONS

Anders Wiehe, "Quantitative Analysis of Efficient Antispam Techniques", Proceedings of the 2006 IEEE, Workshop on Informational Assurance, Jun. 2006, pp. 163-169, West Point, NY, USA.

Twan Grotenhuis, "Exchange 2003 Server Service Pack 2 (SP2) Anti-Spam Framework", blog website, Aug. 9, 2005, http://geekswithblogs.net/twangrotenhuis/archive/2005/08/09/49692.aspx.

Duncan Francis Cook, "Catching Spam Before It Arrives", ACM International Conference Proceeding Series; vol. 167, Proceedings of the 2006 Australasian workshops on Grid computing and e-research—vol. 54, 2006, pp. 193-202, Australian Computer Society, Inc., Darlinghurst, Australia.

Office Action dated Mar. 26, 2014, in Australian Patent Appl. No. 2010263086 filed Jun. 18, 2010.

Amendment dated Apr. 30, 2014, in Australian Patent Appl. No. 2010263086 filed Jun. 18, 2010.

\* cited by examiner

REAL-TIME SPAM LOOK-UP SYSTEM

BACKGROUND

Unsolicited Bulk Email (UBE) is a widespread problem. UBE may include unsolicited commercial email, spam, phishing email and other unsolicited bulk emails. Originators of UBE (spammers) harness the processing power of numerous mail server machines to send UBE. Large-scale Email Service Provid, ers (ESPs) are disadvantaged in processing UBE by the sheer magnitude of their mailing infrastructure and inbound email accepting capacity.

UBE messages can have a number of characteristics which identify them as UBE to ESPs. ESPs generally use a number of mechanisms to reduce the amount of UBE that users of the system receive. Consequently, spammers use a variety of techniques to circumvent the efforts of ESPs to stop their messages. Spammers constantly change routes, domain names, origination IPs, and message content to fool UBE detection systems.

SUMMARY

Technology is described for implementing real time spam filtering before issuing a message acceptance message to a sending email server. One or more queries on components of received email that is suspected to be UBE are issued on receipt of a suspect message. The queries seek information that may identify the message as spam or unsolicited bulk email and which are not readily apparent in the message. Responses to the queries are received and a determination made whether to issue a mail acceptance message before. The queries may relate components of the message to the network infrastructure over which the message has reached an inbound mail server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 illustrates another embodiment of the technology wherein the

DETAILED DESCRIPTION

Technology is described for improving the ability of a large scale enterprise email system to handle unsolicited bulk email (UBE). A real time filtering engine issues one or more queries on components of received email that is suspected to be UBE. The queries seek information which may identify the message as UBE which is not readily apparent in the message. Responses to the queries are received and a determination made whether to issue a mail acceptance message before automatically issuing such an acceptance.

Figure 1:
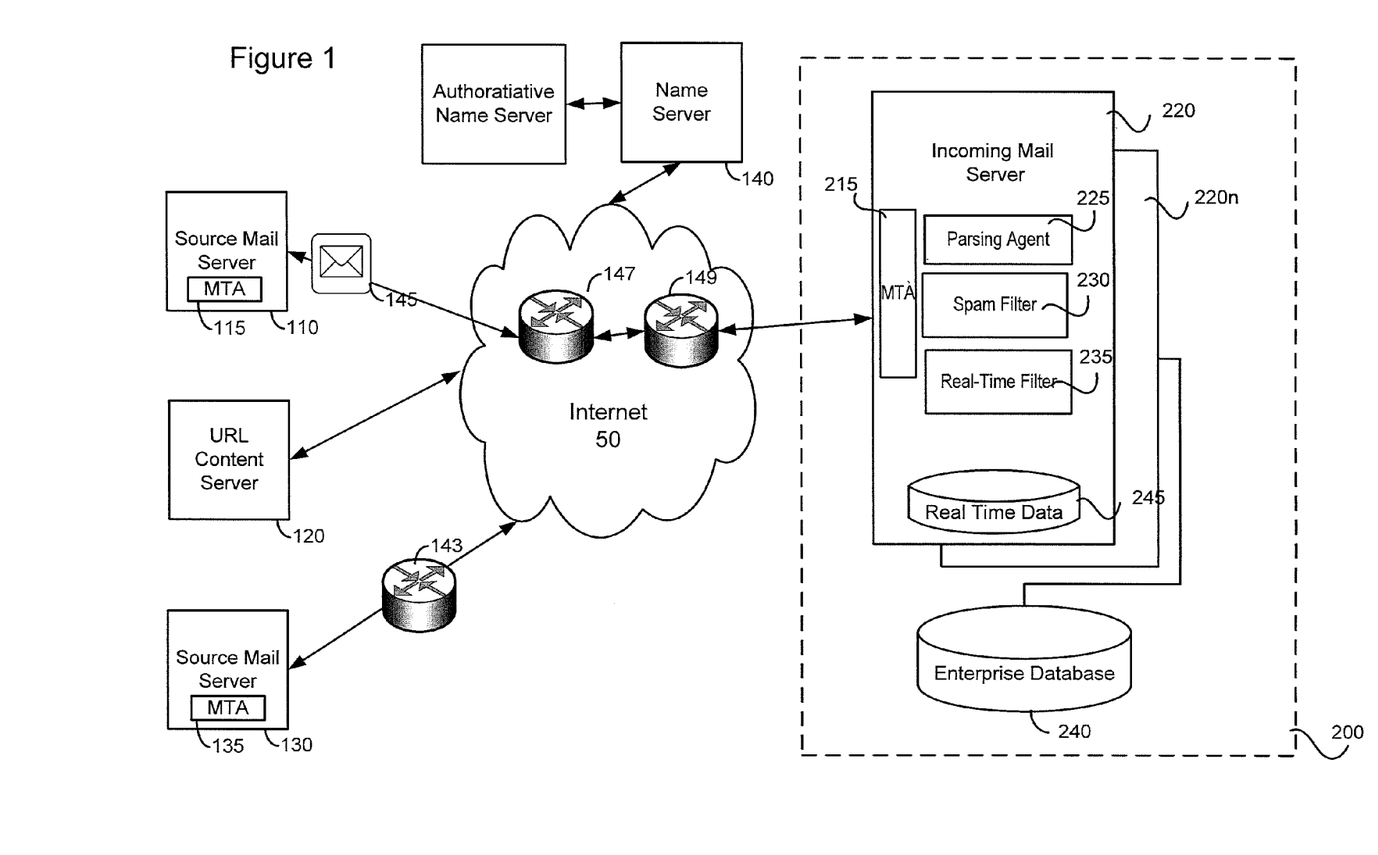
FIG. 1 depicts a block diagram of an enterprise email system.

FIG. 1 is a block level diagram of a system suitable for implementing the present technology. System 200 may be implemented by an email service provider (ESP) and may consist of, for example, an inbound server 220 which comprises one or more processing devices. A plurality of inbound servers 220-220$n$ may be provided within an enterprise 200, all of which may comprise one or more processing devices.

In one embodiment, the email server 220 is a stand alone server and allows users having email addresses on the server to access their mail via any number of formats such as IMAP or POP. In an alternative embodiment, the inbound server 200 is one of a plurality of front-end servers which pass messages to any number of back-end processing devices which store email for users of an enterprise. The technology discussed herein is applicable to stand alone email servers and enterprise environments.

Inbound email server 220 receives email messages transmitted via the Internet 50 (or other suitable network) from sending servers 110, 130, each having a respective MTA 115, 135. The inbound MTA 215 handles connections from sending mail servers coupling to the inbound MTA via Internet 50 and performs an initial set of acceptance and filtering tasks on inbound email. In general, the MTA can accept or refuse the incoming connection request attempt in the host networking protocol.

Inbound email server 220 may include a parsing agent 225, a spam filter 230, a real time filter 235 and real time data 245. As described below, an initial check by the spam filter 230 is applied to incoming messages and associates a spam score with each message. The spam content filter 230 may comprise any of a number of content filtering methods including for example, methods to determine if the message contains phishing content, suspect links or viral attachments. If email is deemed deliverable, the inbound email MTA will accept the message.

The enterprise database maintains a global spam data for all sources seen by the system 200. Data can be distributed from real time databases 245 in individual servers 220 to the enterprise database for distribution to other servers 220$n$.

Parsing agent 225 acts as a feature extraction component 110 that can detect and extract Internet Protocol (IP) addresses, domain names, and URLs and other information found in a message 145. The real time filter 235 uses the information provided by the parsing agent to run real-time queries on elements of data extracted from a message to determine whether non-obvious elements of the message indicate a likelihood of a spam or nefarious message. The real time filter 235 includes a lookup component that can perform any number of parallel and asynchronous queries, such as reverse-DNS lookups on an IP address and other queries outlined below to ascertain the status of a message.

FIG. 1 also illustrates an abstract view of a message 145 through a network. For example, a sender's edge message server 110 sends a message 145 to the incoming mail server 220 via internet 50. Internet 50 includes a number of routers 143, 147, 149 that are connected to each other (and other components). Messages 145 travel from a sender's computer 110 via routers 147, 149, etc. until they reach the destination computer 220. The flow of information through routers is not recorded in email. Routers do not modify the information that pass through them. Email can sometimes travel directly from one server to another server. When passing from mail server to mail server, a line giving the server IP address may be added to the email, so the flow between servers is typically recorded. However, each mail server can modify this information in any way desired. Thus, only the IP address of the last mail server to server 200 can generally be trusted—any previous server may have modified the information, or a spammer may have inserted false IP addresses into the headers before sending the message.

Also shown in FIG. 1 are a URL content server 120 which responds to provide content in response to a request for a URL embedded in a message 145. A name server 140 responds to queries for the host of a URL in the message as well as other name service requests. Various routers 143, 147 and 149 can be employed to facilitate communication between the various servers on the network. It should be appreciated that these routers are not unique and that any given commutation between the entities can take different paths through the Internet 50.

Electronic messages are typically sent over via Internet 50 using the simple mail transfer protocol (SMTP) standard. An electronic message sent via SMTP includes source information, recipient information and data information. The source information typically includes a source IP address. The source IP address is a unique address from which the electronic message originated and may represent a single server, a group of servers or a virtual server.

IP addresses can be added to a message header at various points along a message delivery pathway (between a message sender and a message recipient), and thus may affect the message's treatment by a spam filter. The IP addresses detected in the message can be used for reverse DNS information and for route tracing. The last IP address cannot be forged, gives at least one source of the message, and can be predictive. Because of this, spammers may attempt to obtain other IP addresses, by, for example, infecting sending machines with viruses and Trojans. They then use these viruses or trojans to send spam. Thus, the IP address of the message may be the IP address of an infected machine. Consequently, it may be difficult to learn about all possible infections and maintain a real-time record of such infections.

Figure 2:
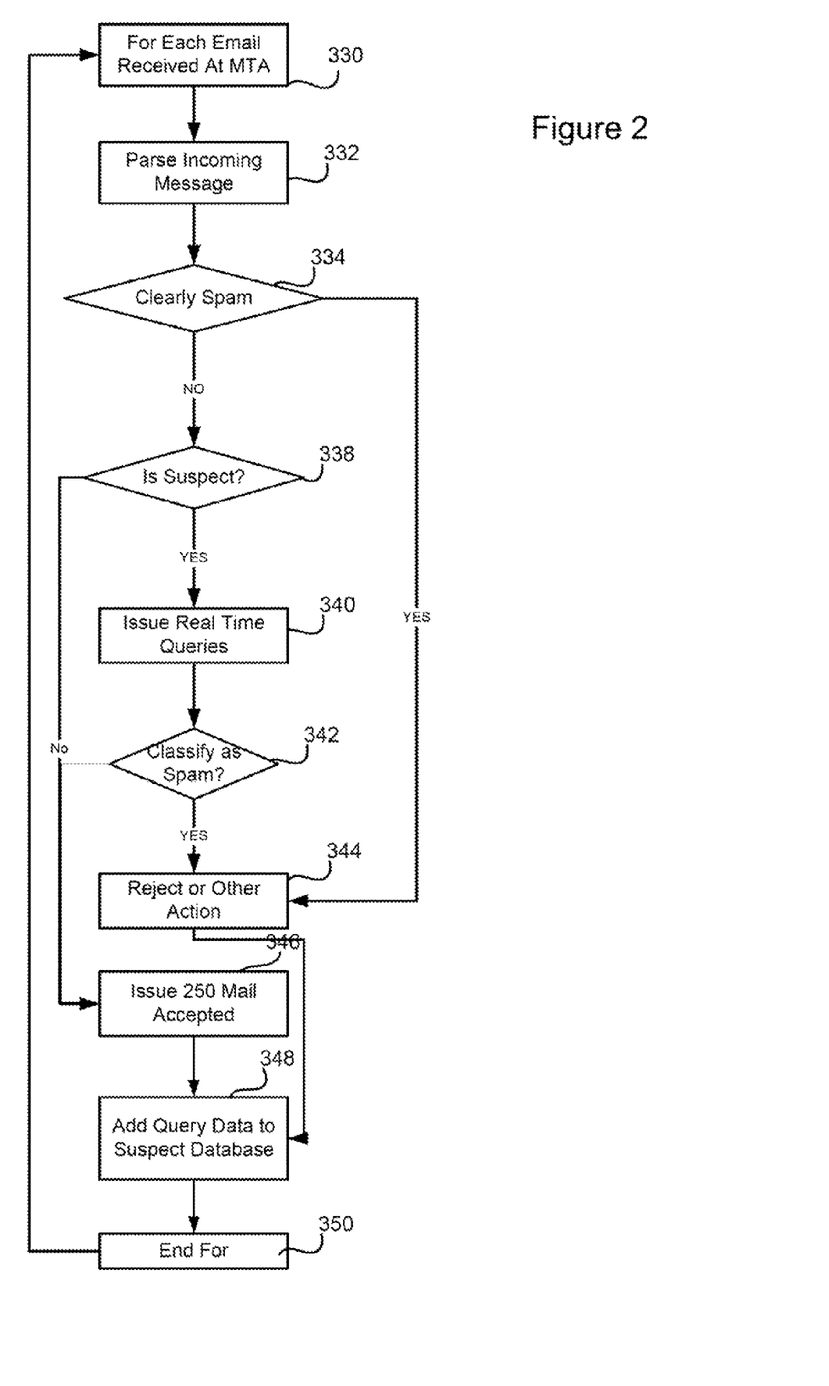
FIG. 2 depicts a method occurring on an inbound mail server and a message information server in accordance with the present technology.

FIG. 2 illustrates a method performed by the various components of the inbound server 220. For each message received at the inbound server at 330, the message is parsed at 332 to extract one or more components used to determine whether the message is UBE to be used for real time characteristic queries on the message. This extraction can include determining, for example, root and second level domains in an embedded URL, extracting IP addresses and other header information, and extracting any component which may be used to determine additional information about the message using a query as described herein.

An initial determination is made at 334 as to whether the message is suspected to be UBE, which should not be delivered to a user. Such messages may include spam or a phishing messages which have one or more embedded URLs linking to content provided on another sever such as content server 120. In one embodiment, the determination 334 is made by the spam filter component 230. This initial determination can be made by examining components of the message readily apparent in the email message header and body, such as the sender, the sender's domain, and authentication information. Historical data may be used to match such known characteristics to spam messages. Known good characteristics can be similarly used to clear messages. In one aspect, the spam filter has access to information in the real time database 245 and can look up one or more components of information from the header or body to make a rapid determination as to whether the message is spam. Such an initial determination may be made by reference to known spam email addresses, domains, sender classifications, spam probability scoring of the message, authentication technologies, or other rapid determination means. Other characteristics of the message may indicate that the message is unlikely to be spam. For example, if the message sender or sender's domain has been previously characterized as a known good message, the message is less likely to be suspect. Still further, a message lacking any features which would indicate whether the message is SPAM or not SPAM might render a determination that the message is suspect. For example, the message may be from a previously unseen domain.

In one embodiment, the spam filter 230 is a specially programmed portion of the inbound email server 200 which includes, for example, lists of known good and known bad email addresses, lists of known good and known bad email domains, domain ranges or IP addresses; and filtering tests which can be run on portions of email messages to determine if the message comprises UBE.

If the message is not clearly spam at 334, then at 338 a determination is made as to whether the message is suspect. Suspect messages may be those which are assigned a spam score by a spam filter lower than a threshold score which clearly indicates spam or which have other characteristics (such as embedded URLs) which are shared by messages known to be UBE.

If the initial determination at 338 is that the message is suspect, then one or more real time queries 340 are performed. In accordance with the technology, results from the queries are used to determine whether to issue a "message accepted" indication to the sending email server. In one embodiment, a plurality of queries is issued at 340 in parallel and asynchronously. Query results can be prioritized as determinative alone or in combination, such that responses received to one or more queries received before other responses can be determinative of the status of a message—the system need not wait for responses to all queries issued. In this aspect, the system in asynchronous. The system further operates in "real time" by receiving answers to queries before completing a message transaction with, for example, a "message accepted for delivery" transaction message.

In the SMTP protocol, a sample exchange generally ends with a "250 OK" or "250 Message accepted for delivery" message after data is received:

---

Connected to mail.example.com (1.2.3.4).
220 mail.example.com ESMTP Ready ...
HELO mail.somewhere.com
250 a.mail.somewhere.com Hello 4.3.1.1.somewhere.com [4.3.2.1],
MAIL FROM:<mike@somewhere.com>
250 2.1.0 <mike@somewhere.com>... Sender ok
RCPT TO:<someone@example.com>
250 2.1.5 <someone@example.com>... Recipient ok
DATA
354 Enter mail, end with "." on a line by itself
Hello there!
OK, bye!
.
250 2Message accepted for delivery
QUIT

---

In this context, "real-time" may not necessarily mean instantaneous, but operates with some of time to pass to allow for issuance of the query and receipt of query responses and analysis of the response, including the determination of whether to issue the "message accepted for delivery" command. It will be recognized that other "real time" actions may be taken on the message other than simply withholding the "message accepted for delivery" message. For example, other actions could include, but are not limited to blocking the connecting IP (dropping the connection), rate limiting the sender based on limits or slowing down the sender all based on thresholds associated with the various infrastructure associated with the sender. Still further actions may include rendering messages differently to the recipient in their email inbox based on the data here. For example if a message has a certain URL that is linked to a suspicious phishing host then a red safety bar can be displayed to the user in the mail interface. Conversely if the message is from a known trusted source, a trusted display mechanism may be used in the mail interface.

At 342, when a response is received to a query issued at 340, a determination is made as to whether the response indicates a problem with the message. Steps 334 and 336 are detailed further in FIG. 4. If the message is determined to be spam, then no "mail accepted" message is sent at 344. If the message is not spam, then a mail accepted message is issued 346. At 348, the data resulting from the query is returned to the real time database for use in the initial determination step at 334 and 338.

In one embodiment, actions taken at 344 include not providing the "250 message accepted" response in an SMTP conversation. However, a number of alternatives may be implemented at step 334. The mail can be can reject the mail by issuing an SMTP level 500 error, the mail accepted but tagged for routing to a junk folder, the message accepted and automatically deleted and/or accept the message and render the mail differently. Actions taken at 344 may depend on the confidence that the message is UBE—a higher confidence could result in an immediate rejection while less confidence could result in acceptance and alternative rendering.

Figure 3:
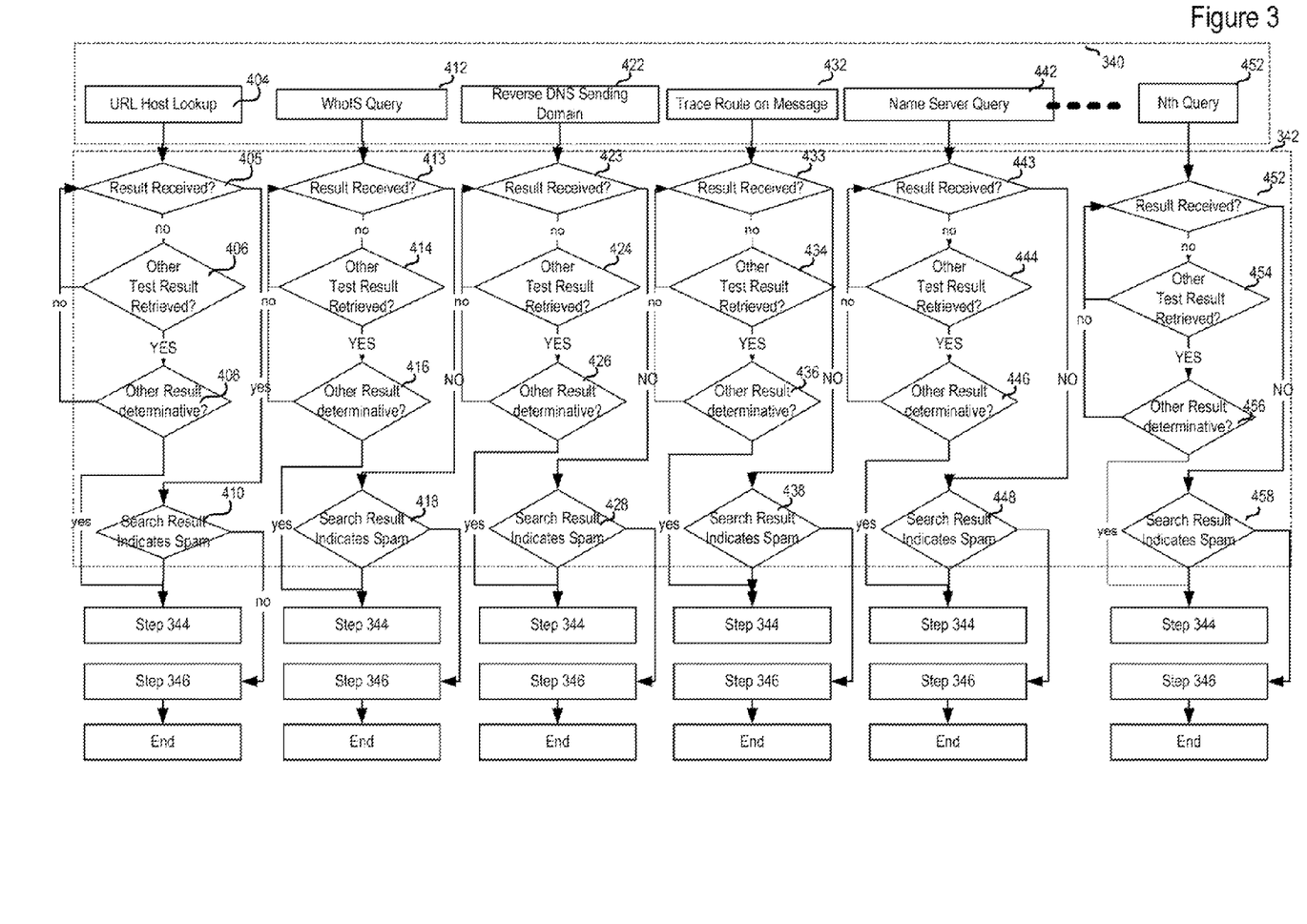
FIG. 3 illustrates a method for issuing simultaneous queries on the characteristics of an inbound email message.

FIG. 3 details steps 340 and 342 in FIG. 2. At step 340, a number of parallel queries may be simultaneously issued on one email message.

As illustrated in FIG. 3, any number of queries 404, 412, 422, 432, 442 452 may be issued in parallel. In one example, the queries include a URL lookup 404 to provide information about the content server, a WhoIs query 412 to provide information on the sending domain or a content server, a reverse DNS query 422 on the sending domain or content server, a traceroute 432 on the path taken by the message to a sending domain or content server, and a name server query 442 to determine potential relationships between spam domain sources. Up to "n" parallel queries may be made. Any type of query which reveals information which is not readily apparent in the message, and which reveals information related to the infrastructure of the network over which the message has been received, may be performed at 240. The examples illustrated in FIG. 3 are not meant to be exhaustive.

Once the queries are initiated (at 404, 412, 422, 432, 442, 452) the system waits for results at of each query at 405, 413, 423, 433, 443, 453, respectively. Because all queries may not retrieve results in the same time frame, for each query, a determination is made as to whether another query result has been received at 406, 414, 424, 434, 444, 454. If another result is retrieved, a determination is made as to whether that result (alone or in combination with another query result) is determinative of the message being UBE or not UBE at 408, 416, 426, 436, 446, 456, respectively. If the message is determined to be UBE as a result of the another test result being received, the message is flagged as spam at 344. If not, the method proceeds to step 346 and, as indicated in FIG. 2, a "mail accepted for delivery" message is provided.

If no prior results are retrieved, the result of each query may determinative at 410, 418, 428, 438, 448, 458. As described below, if the result is not determinative, the result data can be used on combination with other query results before determining whether to issue the message accepted message.

Each of the queries is designed to return discoverable information about the message. For example, spammers may create very many hostnames cheaply. These hostnames can share many attributes. By examining a number of messages and returning data about the message, patterns in components such as IP ranges, registrant name or address, or common name servers may appear. These commonalities are used to identify newly received messages as UBE. Each query is designed to examine not just a component of the message presented with the message itself, but to delve further into discoverable aspects of the component which reveal the true nature of the message. Many of the searches are tied to discovering information about message components that are linked to the network infrastructure.

A URL host lookup query 404 may occur in the situation where a URL is provided in the body of an email message which points to additional content or which is embedded and designed to display content in, for example, an HTML coded message. The URL query 404 examines characteristics of the URL to determine whether the message is UBE, and use the characteristic to initiate queries on the message. In one embodiment, URL features may be analyzed for clues to whether the URL points to a suspect content server. Portions of the URL may be extracted and used in spam filtering. For URL features, spammers may attempt to deceive machine learning filters by including both good URLs that belong to other people, as well as ones they control. For example, a spammer may include microsoft.com somewhere in its message because it may be known as a good or "safe" URL. In order to mitigate this hijacking, count-based and combination-based URL features can be included as inputs to the machine learning filter.

A URL host lookup 404 examines additional characteristics of the URL including whether the domain of the URL has a known relationship to UBE entities. The URL host lookup can produce results which can be combined with other queries, such as a WhoIs query, to provide additional spam characteristics.

A WhoIs query can return information which may identify relationships between domains in terms of an owner, owner address or other data returned by a WhoIs query. The WhoIs query can return the owner of a domain name, an IP address, or an autonomous system number on the Internet. In a situation where a spammer has used a multitude of domain addresses, a WhoIs query may reveal that nefarious domains share a common owner or common street address, and the owner or address can be used to identify future nefarious domains.

The reverse DNS query 422 can be used to resolve IP addresses associated with an email to a domain name, and those names derived from the Reverse DNS query compared to known nefarious domain names (or used in combination with other queries) to determine if a message is likely UBE. Another technique is to perform a Reverse-DNS lookup on an IP address. Note that the person who controls the machine at an IP address may not control the reverse DNS address entry for that IP address. For instance, a home computer user may have an infected computer sending spam via a cable modem or DSL line. It is his internet provider that controls the reverse DNS address entry for the IP address of the cable/DSL line. The spammer controls the computer, but not the DNS entry. Even a spammer who controls a DNS server may not control the reverse DNS address entries for the computer. Even in the case where a spammer does control the DNS entry for the computer a common technique is to perform a reverse DNS lookup and then perform a DNS lookup on the resulting RDNS entry; if the two lookups do not match there is good evidence that the DNS server is miss-configured or compromised and any information from it can be discounted.

Reverse DNS address entries are configured in a slightly different way than regular entries, and often one must have a large number of IP addresses in order to control the reverse DNS address entries. In some cases, reverse DNS address entries are left blank, or missing. An IP address can be analyzed by way of a reverse DNS lookup component 410. This involves more than simply checking if the address is NULL, or if it contains other strings, such as DSL. Rather, the null and/or the name return in the non-null information can be taken and used as inputs to the real time database.

A traceroute query 432 derives at least one path between two IP addresses. Although there may be many alternate paths through the internet between any two computers, common factors in traceroute paths can reveal likelihoods of a message being spam. Traceroutes can narrow in on a geographic location where the sender is located. The traceroute operation refers to a tool that can send trace packets for determining information. In particular, this tool can trace the route of UDP packets for the local host to a remote host. The traceroute can also display the time and location of the route taken to reach its destination computer. After the relevant IP address is determined, a traceroute can be performed, determining the last one, two, or more routers used to reach the sender's external server. Information obtained by way of the traceroute can be used to train filters such as spam filters.

A spammer may attempt to deceive a spam filter that uses IP addresses by acquiring a large number of IP addresses. However, it is easier to acquire a diverse range of IP addresses than it is to acquire a diverse number of connections to the internet. "Traceroute" information can be employed to learn about the path that a spammer uses to connect to the internet. By looking at the last and the second-to-last hops, etc., the route that the spam is taking can be learned. For example, it can be found that much spam follows a common route.

Routers do not modify the information that pass through them. Email can sometimes travel directly from one server to another server. When passing from mail server to mail server, a line giving the server IP address is added to the email, so the flow between servers is typically recorded. However, each mail server can modify this information in any way desired.

A DNS lookup 442 for the URL, sender domain or information culled from other searches may be performed. Spammers may have only a single DNS server for multiple hostnames. As a result, the identity of the DNS server may be a valuable feature to a spam filter. A spammer may have multiple DNS servers, but they may reside nearby on the network. Thus, using a traceroute in combination with a DNS query to obtain the path to the DNS server may provide valuable information. The DNS server may be of a specific favored type. Version information about the DNS server may be valuable information.

Using the DNS server, the hostname can be converted to an IP address. If the various hosts created by the spammer reside on the same server, they should or can have the same IP address. Thus, the IP address or portions thereof may be a valuable feature for a spam filter. The IP address must be contacted over the Internet. By performing a traceroute on the IP address, we may find that many IP addresses are connected in a similar way. Queries on authoritative name servers can also reveal similar commonalties with nefarious servers.

Figure 4:
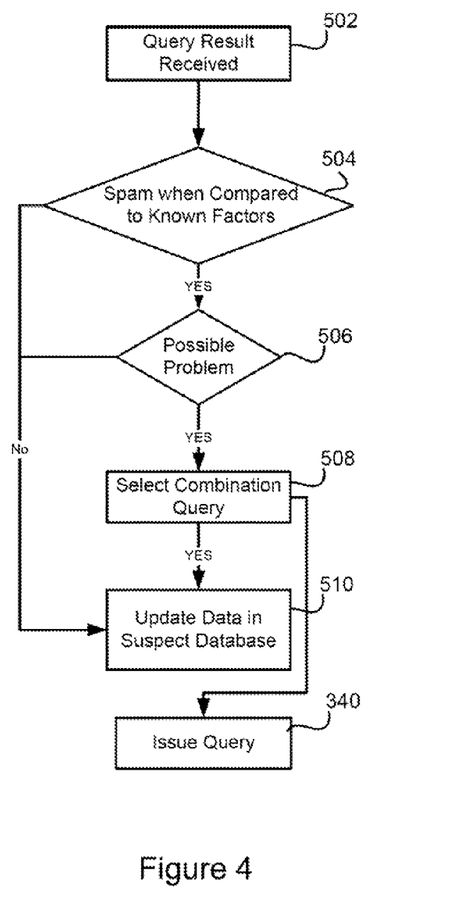
FIG. 4 illustrates a method for determining whether a message is spam based on queries received against other characteristics of the message.

FIG. 4 illustrates the process of determining whether an individual query indicates a message is spam (steps 410, 418, 428, 438, 448, 458) in FIG. 3. At step 502, the query result from the component query is received. At 504, an initial determination is made as to whether the result clearly indicates a particular message is UBE. For example, if a traceroute query reveals a message path exactly matching that of another traceroute query of a known UBE message, the message may be marked as definitely UBE. If the query result does not clearly indicate a UBE message, it may still indicate that a potential problem with the message exists at 506. For example, one may require that some larger number of messages with a given message path be received to define a message as clearly spam, but receiving a lesser number of messages with the same path might give rise to suspicion about the message and if suspicion is present at 506, a combination query may be selected at 508 and issued by returning to step 340. Another alternative would be to flag a message as a possible problem if a message has never been seen from a particular sender before the message could have a perfect score but the fact that the message is from a first time sender may override other factors. In all cases, the real time information database is updated at 510.

At least two alternatives exist for determining which queries may be run at step 340. In one alternative, the queries may be run based on the scale of the inbound server 220. If a significant number of inbound servers are being used, a limited number of queries may be used for inbound messages. In such an environment, it is likely the system must handle a significant volume of messages. Any significant delay in issuance of message acceptance messages could cause spammers to attempt to open additional connections to the inbound mail server. Hence, timeouts may further be employed such that if there are no determinative responses received within a specific time period, the message must be accepted. In another embodiment, the query strategy may be based on types of problems seen at the inbound server. If specific UBE patterns are determined to be more likely than others, queries may be limited to those types of queries designed to focus on those problems most commonly seen.

Figure 5:
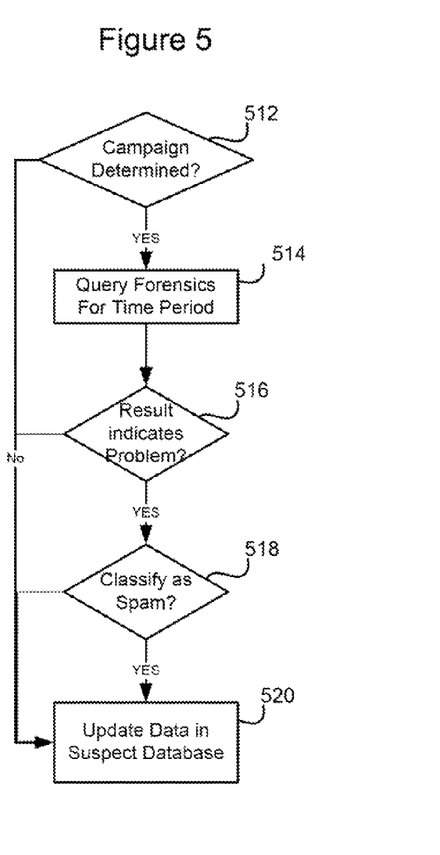

FIG. 5 illustrates a further unique aspect of the present technology whereby the queries of step 340 may be run for the duration of a UBE campaign (beyond merely a real time query for a message) or for a period of time to address a UBE campaign. In some instances, spammers may use unique time periods in which to distribute a group of UBE message or a UBE campaign. The campaign may last for longer than a period of initial messages received at the inbound server. At step 512, a campaign is determined by receipt of some number or pattern of messages at the inbound message server. Any number of methods may be used to determine that a UBE campaign is in progress. In addition, the type of campaign may be determined. For example, the spammer may send a series of messages with an embedded URL addressing a domain which is active only for a certain period of time. Once a spam campaign has been determined, instead of running the query in real time for each message received, one or more queries can be run for a period of time at 514. For example, a reverse DNS query can be run against domain in the URL until the campaign ends or as long as a problem is indicated at 516. The URL or domain can be classified as a spam linked domain until such time as the query period ends or the query indicates that the domain is no longer active.

Figure 6:
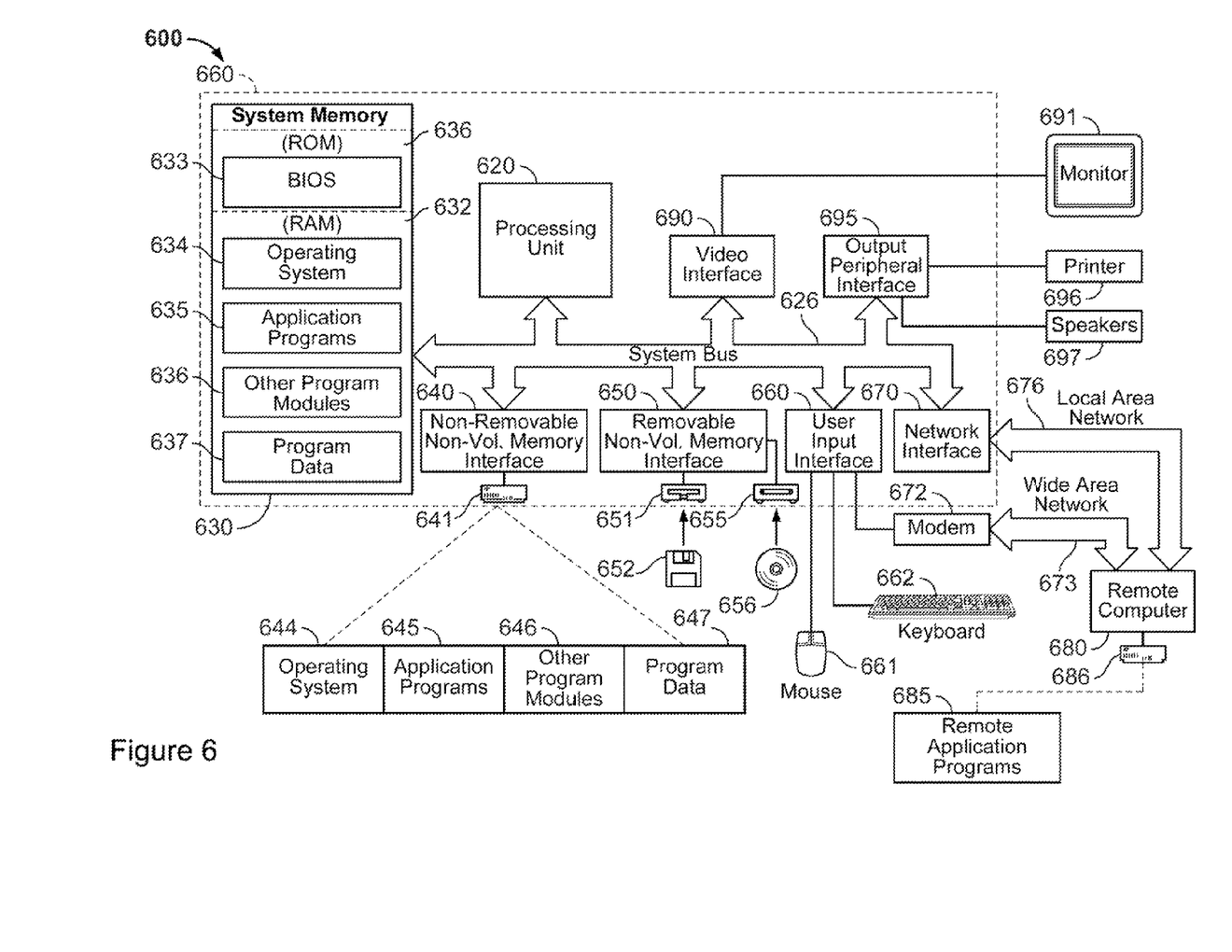
FIG. 6 is a diagram of a processing system suitable for implementing the technology described herein.

With reference to FIG. 6, an exemplary system for implementing the technology includes a general purpose computing device in the form of a computer 660. Components of computer 660 may include, but are not limited to, a processing unit 620, a system memory 630, and a system bus 626 that couples various system components including the system memory to the processing unit 620. The system bus 626 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 660 typically includes a variety of computer readable media. Computer readable media can be any available media that can be accessed by computer 660 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 660. Communication media typically embodies computer readable instructions, data structures, program modules or other data and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 636 and random access memory (RAM) 632. A basic input/output system 633 (BIOS), containing the basic routines that help to transfer information between elements within computer 660, such as during startup, is typically stored in ROM 636. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 660 may also include other removable/non-removable, volatile/nonvolatile computer storage media. By way of example only, FIG. 6 illustrates a hard disk drive 640 that reads from or writes to non-removable, nonvolatile magnetic media, a magnetic disk drive 656 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 646 is typically connected to the system bus 626 through a non-removable memory interface such as interface 640, and magnetic disk drive 656 and optical disk drive 655 are typically connected to the system bus 626 by a removable memory interface, such as interface 650.

The drives and their associated computer storage media discussed above and illustrated in FIG. 6, provide storage of computer readable instructions, data structures, program modules and other data for the computer 660. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 660 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 626 via an interface, such as a video interface 690. In addition to the monitor, computers may also include other peripheral output devices such as speakers 697 and printer 696, which may be connected through an output peripheral interface 690.

The computer 660 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 660, although only a memory storage device 686 has been illustrated in FIG. 6. The logical connections depicted in FIG. 6 include a local area network (LAN) 676 and a wide area network (WAN) 673, but may also include other networks. Such networking environments are commonplace in offices, enterprise-wide computer networks, intranets and the Internet.

When used in a LAN networking environment, the computer 660 is connected to the LAN 676 through a network interface or adapter 670. When used in a WAN networking environment, the computer 660 typically includes a modem 672 or other means for establishing communications over the WAN 673, such as the Internet. The modem 672, which may be internal or external, may be connected to the system bus 626 via the user input interface 660, or other appropriate mechanism. In a networked environment, program modules depicted relative to the computer 660, or portions thereof, may be stored in the remote memory storage device. By way of example, and not limitation, FIG. 6 illustrates remote application programs 685 as residing on memory device 686. It will be appreciated that the network connections shown are exemplary and other means of establishing a communications link between the computers may be used.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of managing unsolicited email sent to an email system over a public network, the system including a plurality of inbound mail servers, comprising:
   (a) receiving an email message at an inbound mail transfer agent and before issuing a message accepted message to a sender of the email message,
      initiating a plurality of concurrent queries to publicly accessible hosts on the public network for additional public information on a plurality of different characteristics of the message, each query returning public network infrastructure information on one or more of said plurality of characteristics based on public network infrastructure information available regarding the characteristics responsive to the queries; and
      determining whether the message is unsolicited bulk email based on public network infrastructure information received in the response to said plurality of queries by determining, for each of the plurality of queries when a reply to said each of the plurality of queries is received, determining if another concurrent query has returned results prior to each said query and if so whether said returned results are dispositive of whether the message is unsolicited bulk email, and if not, waiting for results from said each of the plurality of queries;
   (b) after said determining, if the message is not unsolicited bulk email, issuing the message accepted message to the sender and if not, withholding the message accepted message.

2. The method of claim 1 wherein the said determining includes determining whether the message is suspect based on the response of a previous query.

3. The method of claim 1 wherein the method further includes storing the response of each query for use in said determining.

4. The method of claim 1 wherein the determining includes updating search results from a plurality of concurrent searches to perform the determining step.

5. The method of claim 1 wherein said determining comprises at least one of:
   determining a true source IP for a message and whether that IP is associated with known spam senders;
   determining a source IP for a message and whether that IP is associated with a block of IPs associated with known spam senders;
   determining a source IP and whether a registrant of a domain associated with the source IP is IPs associated with known spam senders;
   determining for a domain name an authoritative name server for the domain and whether the ANS is associated with a known spammer;
   determining an MX record associated with a sender and whether domains or IP addresses in the MX record are associated with known spam senders;
   determining a host name associated with a known IP address of an email source and determining whether host name server IPs are associated with known spam senders;
   determining a name server associated with a sending domain and determining whether the name server is associated with known spam senders.

6. The method of claim 1 wherein the step of initiating includes performing a plurality of queries on multiple characteristics of the message.

7. The method of claim 1 wherein the method includes performing a plurality of queries asynchronously.

8. The method of claim 1 further including receiving a reply to one of the plurality of queries and determining whether the reply is determinative of whether the message is spam before receiving replies to others of said queries.

9. The method of claim 1 wherein the method further includes one or more of:
   determining to reject the message by issuing an SMTP level 500 error;
   determining to accept the message and route the message to a junk folder,
   determining to accept the message and automatically deleting the message;
   determining to accept the message and rendering the message differently.

10. A method for determining whether to issue a mail accepted for delivery message for an email message received over a public network, comprising:
   accepting the email message for delivery and prior to issuing a message accepted for delivery message to a sender,
   determining whether the email message has spam characteristic;
   for each message having a spam characteristic, issuing a plurality of parallel queries on one or more different characteristics of the message to public hosts on the public network to determine public network infrastructure information regarding the characteristic, and determining whether the message shares network infrastructure characteristics with messages previously determined to be spam using public infrastructure information returned in response to at least one of the plurality of parallel queries;
   receiving a reply including public infrastructure information to a subset of less than all of the plurality of parallel queries;
   determining if the reply received is sufficient to determine whether the message is or is not spam;
   determining whether the email message is or is not spam by evaluating the reply such that if the reply received is sufficient to determine whether the message is or is not spam, determining, based on said reply, whether the message is or is not spam, and ignoring other replies and if not waiting for one or more additional replies and determining whether or not the message is or is not spam based on the additional replies
   subsequent to said determining issuing a message accepted for delivery message to the sender if the message is not spam and disposing of the message without issuing a message accepted for delivery message if the message is spam.

11. The method of claim 10 wherein the method further includes storing reply queries for use in each determining step, issuing includes determining whether the message is suspect based on results of a previous query.

12. The method of claim 11 wherein said determining includes using updated search results from a plurality of concurrent queries to perform the determining step.

13. The method of claim 12 wherein determining whether a message has a spam characteristic includes determining one or a sender classification, whether the message is authenticated or determining a spam probability based on assigning a spam score.

14. The method of claim 13 wherein the step of determining whether the message is or is not spam includes at least one of:
   determining a true source IP for a message and whether that IP is associated with known spam senders;
   determining a source IP for a message and whether that IP is associated with a block of IPs associated with known spam senders;
   determining a source IP and whether a registrant of a domain associated with the source IP is IPs associated with known spam senders;
   determining for a domain name an authoritative name server for the domain and whether the ANS is associated with a known spammer;
   determining an MX record associated with a sender and whether domains or IP addresses in the MX record are associated with known spam senders;
   determining a host name associated with a known IP address of an email source and determining whether host name server IPs are associated with known spam senders;
   determining a name server associated with a sending domain and determining whether the name server is associated with known spam senders.

15. The method of claim 14 wherein the step of initiating includes performing a plurality of queries on an multiple characteristics of the message.

16. The method of claim 15 wherein the method includes performing the plurality of queries asynchronously.

17. The method of claim 10 further including receiving a reply to one of the plurality of queries and determining whether the reply is determinative of whether the message is spam before receiving replies to others of said queries.

18. A messaging system comprising a processing device coupled to a public network and receiving messages from the public network, the processing device including code providing instructions to the processing device to implement the steps of:
   providing a message transfer agent managing connections to the messaging system, the message transfer agent receiving an email message;
   providing an inbound email parsing agent including a mail component extraction module;
   providing a suspect email determination module including which includes code performing the steps of:
   accepting the email message and prior to issuing a mail accepted message to a sender of the email message, determining whether an email message has spam characteristic, and
   for each email message having a spam characteristic, issuing a plurality of parallel queries on the email message to public hosts having public infrastructure information, each query seeking public infrastructure information on a different characteristic of the message to determine public network infrastructure information regarding each queried characteristic;
   receiving a reply to one or more of the plurality of queries, the reply including public infrastructure information;
   determining from the public infrastructure information received in reply to one or more queries whether the message shares characteristics with messages previously determined to be spam or not spam based on network infrastructure information shared by spam messages;
   determining if the reply received is sufficient to determine whether the message is or is not spam, and if the reply received is sufficient to determine whether the message is or is not spam, ignoring other replies and determining, based on said reply, whether the message is or is not spam, and if not waiting for one or more additional replies and determining whether or not the message is or is not spam based on the additional replies; and
   subsequent to said determining whether or not the message is or is not spam, issuing a message accepted for delivery message to the sender if the message is not spam and disposing of the message without issuing a message accepted for delivery message to said sender.

19. The system of claim 18 wherein the code issuing a plurality of queries includes issuing a query for a plurality of:
   determining a true source IP for a message and whether that IP is associated with known spam senders;
   determining a source IP for a message and whether that Ip is associated with a block of IPs associated with known spam senders;
   determining a source IP and whether a registrant of a domain associated with the source IP is IPs associated with known spam senders;
   determining for a domain name an authoritative name server for the domain and whether the ANS is associated with a known spammer;
   determining an MX record associated with a sender and whether domains or IP addresses in the MX record are associated with known spam senders;
   determining a host name associated with a known IP address of an email source and determining whether host name server IPs are associated with known spam senders;
   determining a name server associated with a sending domain and determining whether the name server is associated with known spam senders.

* * * * *